United States Patent Office 3,220,347
Patented Nov. 30, 1965

3,220,347
AUTOMATIC WEB TENSION-WEB SPEED AND WEB LENGTH COMPENSATION CONTROL SYSTEM
Hans J. Luehrs, Westerly, R.I., assignor to The Cottrell Company, Westerly, R.I., a corporation of Delaware
Filed Feb. 14, 1964, Ser. No. 344,920
17 Claims. (Cl. 101—179)

This invention is applicable to web control and is illustrated in connection with a rotary multi-color printing press.

In multi-color printing operations at high speed, for good color and back-to-back register, maintenance of uniform web tension, web speed and web length compensation control throughout the press, as well as across the swiftly traveling web, become essential requirements for economical operation.

Theoretically, these requirements are only possible at a uniform operational web speed in connection with a closely-related drying and cooling rate, printing on a perfectly straight web having a uniform percentage of humidity content and the absence of other fluctuating or disturbing factors.

A change in this web speed, drying and cooling relation, a paster, the folder cutoff operation, a cambering web and/or a poorly conditioned paper roll will cause web tension and web length fluctuation and subsequent misregistration, cutoff variations and web breaks. This causes excessive press down time and waste, especially in multi-color web offset operations, wherein the delicate balance of ink and water add to the problem.

With demand for higher web speeds in connection with larger dryers and, consequently, longer web leads, this down time and waste increases in progressive proportions. It follows that an automatically-maintained combination web tension-speed-length relation control, quickly and directly responsive to variable operational differences, is desirable.

Various means, such as directly hydraulically or pneumatically-operated P.I.V. driven feed rolls or web compensators, web steering rolls and motorized circumferential-longitudinal plate cylinder adjustments, actuated by electronic sensing heads, are presently used to provide such controls. However, these automatically-controlled variable speed drives are only partly effective, because the inherent resistance of V-belts to quick-speed adjustments and their remote, time-consuming hydraulically or pneumatically-actuated controls subject such systems to a certain delayed action, which becomes inconsistent with rapid web tension fluctuations, thus rendering the system irresponsive when such fluctuations are encountered.

For circumferential-longitudinal plate cylinder or compensator adjustments by electronic sensing heads, similar delays are caused by the electrical-mechanical control components of such systems. Furthermore, the sensing heads must detect a misregister before corrective action on the web length, itself, can take place. Actually, a small amount of misregister must occur before it is eliminated, thus defying the purpose of such systems for optimum perfection.

The main object of my invention is to provide web tension, speed and length compensating controls in a web processing machine, such as a multi-color printing press, or the like, wherein said controls are instantaneously responsive to maintain a given web tension speed and length relation throughout the press at all speeds.

Another object of the invention is to maintain a basic pre-determined web tension between first and second printing units wherein said web tension normally depends on the difference of the printing diameters of the first and last printing units and/or the rate of web shrinkage in the dryer.

Another object of the invention is to provide interrelated control means for the press speed and the rate of drying, in combination with web length compensating means between first and second printing units wherein any selected press or web speed will correspond to a related rate of drying and wherein shrinkage variations of the web between printing units are compensated to maintain the initially determined web tension and back-to-back register at all operating speeds of the press.

Another object of the invention is to provide a positive web feeding unit between the white roll reel and the first printing unit, adapted for initial adjustment to match the basic web tension between first and second printing units and to automatically maintain this tension independent of web tension variation caused by lopsided paper rolls and roll replenishing web splices at any selected press speed.

Another object of the invention is to provide novel drive means for the cooling rolls, adapted to automatically maintain or adjust their surface speed to conform to the prevailing web speed, independent of thermal contractions caused by the cooling medium in said water rolls thus eliminating speed differences between the traveling web and the surface of the shrunken cooling rolls.

Another object of the invention is to provide a positive web feeding unit between the last printing unit and the folder, adapted to be initially set to match the basic web tension between first and second printing units and to automatically maintain this tension in combination with web length compensating means between the second printing unit and the folder to maintain cutoff accuracy, independent of changes in press speeds or web shrinkage in the dryer.

Another object of the invention is to provide the first and second web tension units with means wherein cambered or baggy webs will be independently controlled across their width to automatically adjust for corresponding sectional tension variation and to compensate for localized web length variation in correspondingly localized portions of the traveling web across its entire width.

Another object of the invention is to provide adjusting means, including a visual gauge, whereby the actuating forces may be pre-adjusted to accommodate a given narrow width web, which may be located off the centerline of the press.

Another object of the invention is to provide variable speed means with rubber-covered rolls adjustably interposed between a driving steel roll and driven steel rolls wherein the opposing loads, to deflect the rubber, are thus neutralized and wherein the diameter of the rubber rolls is irrelevant to the required basic surface speed and wherein the two rubber deflecting contacts provide compounded speed variations relative to displacements of the rubber-covered rolls interposed between the driving steel roll and the driven steel rolls.

Although the invention is applicable to web offset, web gravure and other web printing or web processing operations, all references and drawings herein represent a typical double five-color letter printing press application only.

Broadly my invention comprises a web supply, a first tension unit driven from the main press drive and interposed between the web supply and a first multi-color printing unit. From the first printing unit the web travels to and through a web drive unit, a first self-adjusting water roll drive unit, around an air-pressurized compensator, to and through a second multi-color printing unit, back through the dryer, to and through a second self-adjusting water roll drive unit and to and through a second tension unit, said tension units and self-adjusting water roll drive units being driven from the main press drive. The web then travels into a folder from which it may be delivered as desired.

A practical embodiment of my invention is represented in the accompanying drawings in which.

Figure 1:
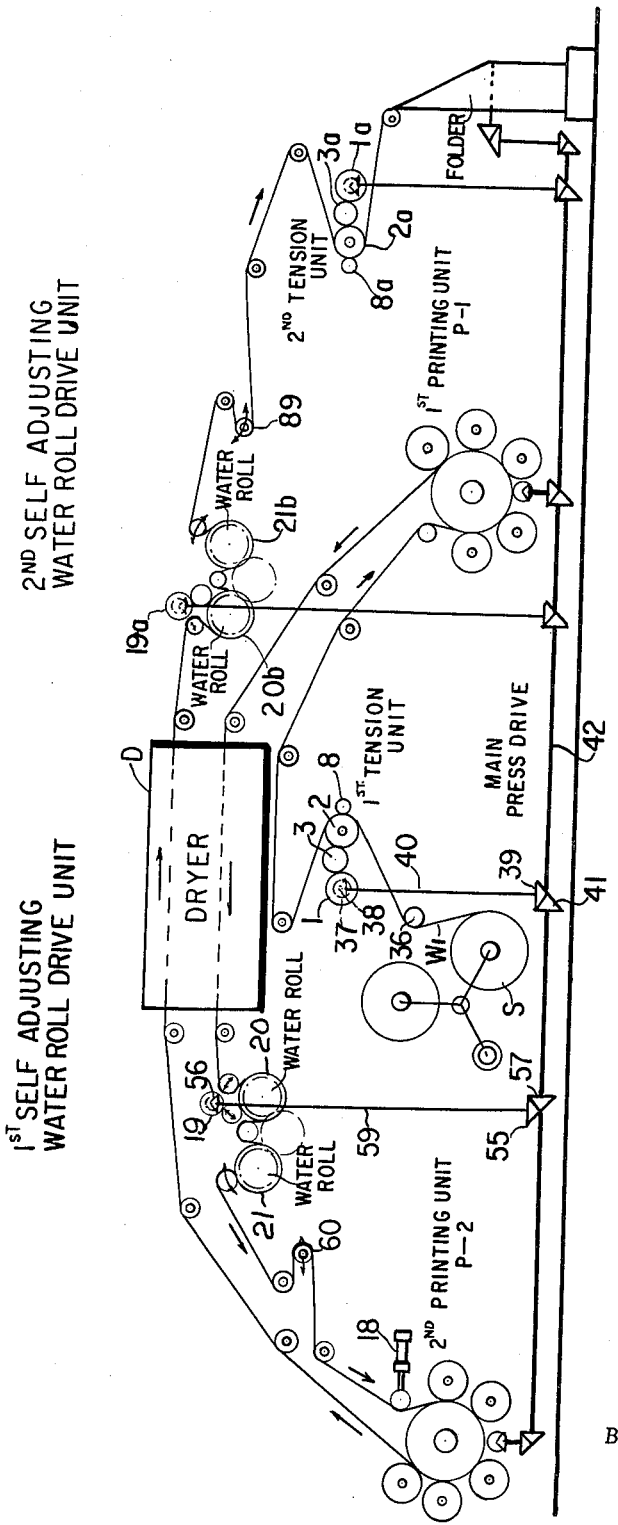
FIG. 1 represents in diagrammatic side elevation a multi-color web perfecting press embodying my invention.

Referring to the accompanying drawings, web W1 is taken from the web supply roll S around a roller 36 into the first tension unit which controls the web entering the first printing unit. Uniformly press driven steel roll 1 provides the drive for web propelling rolls 2 and 8 through a rubber roll 3 which is moved into a variable engagement with said rolls 1 and 2 as will be set forth below. Roll 1 is geared into the main press drive as shown in FIG. 1 through the gears 37, 38 and 39, the latter two being located on opposite ends of the shaft 40, said gear 39 engaging a gear 41 on the main drive shaft 42.

Figure 2:
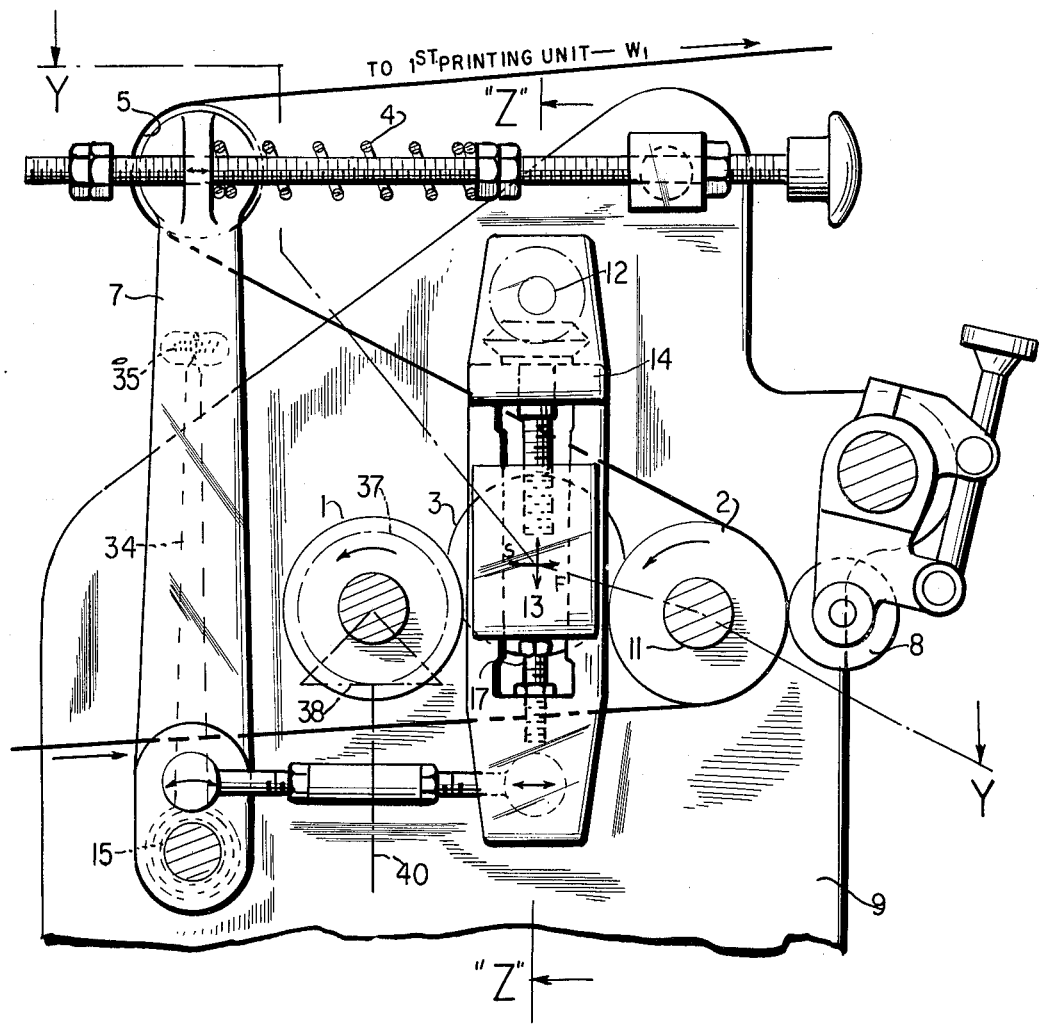
FIG. 2 represents on an enlarged scale a side elevation partly broken away and partly in section of a first tension unit which is interposed between the web supply and the first printing unit.
Figure 4:
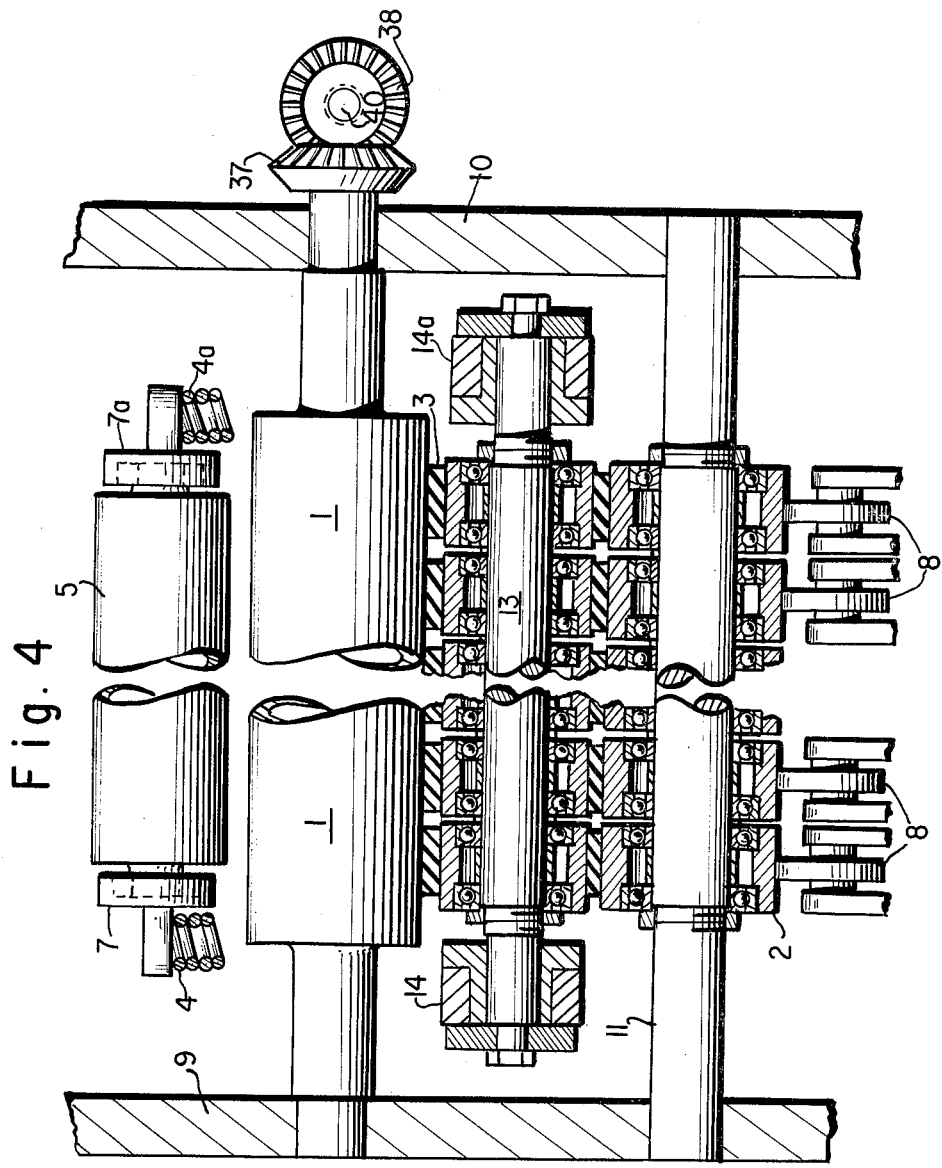
FIG. 4 represents a top view of a section taken on the line Y—Y of FIG. 2 looking in the direction of the arrows.
Figure 5:
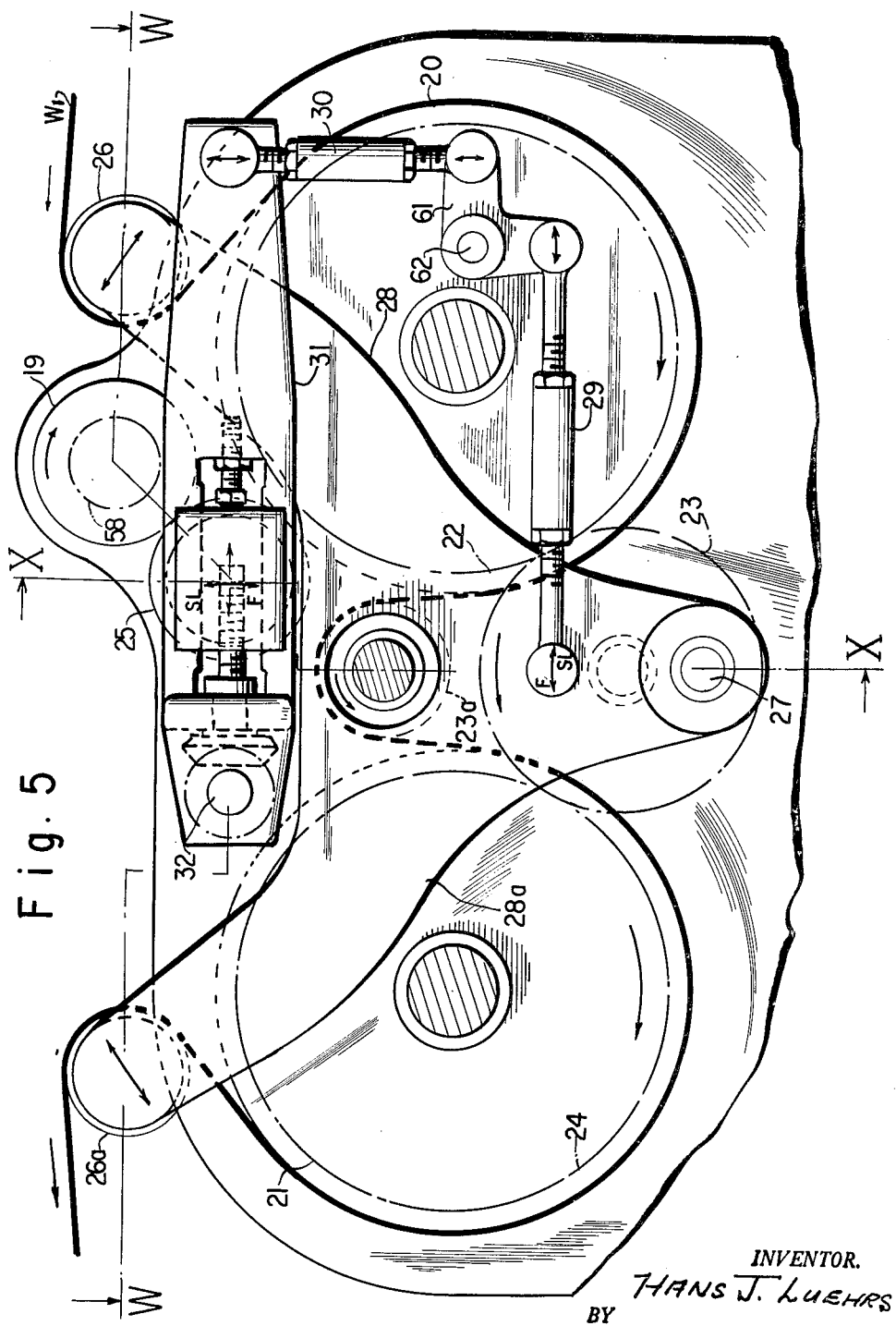
FIG. 5 represents a self-adjusting water roll drive for the first unit shown as interposed between the dryer and the second printing unit.
Figure 9:
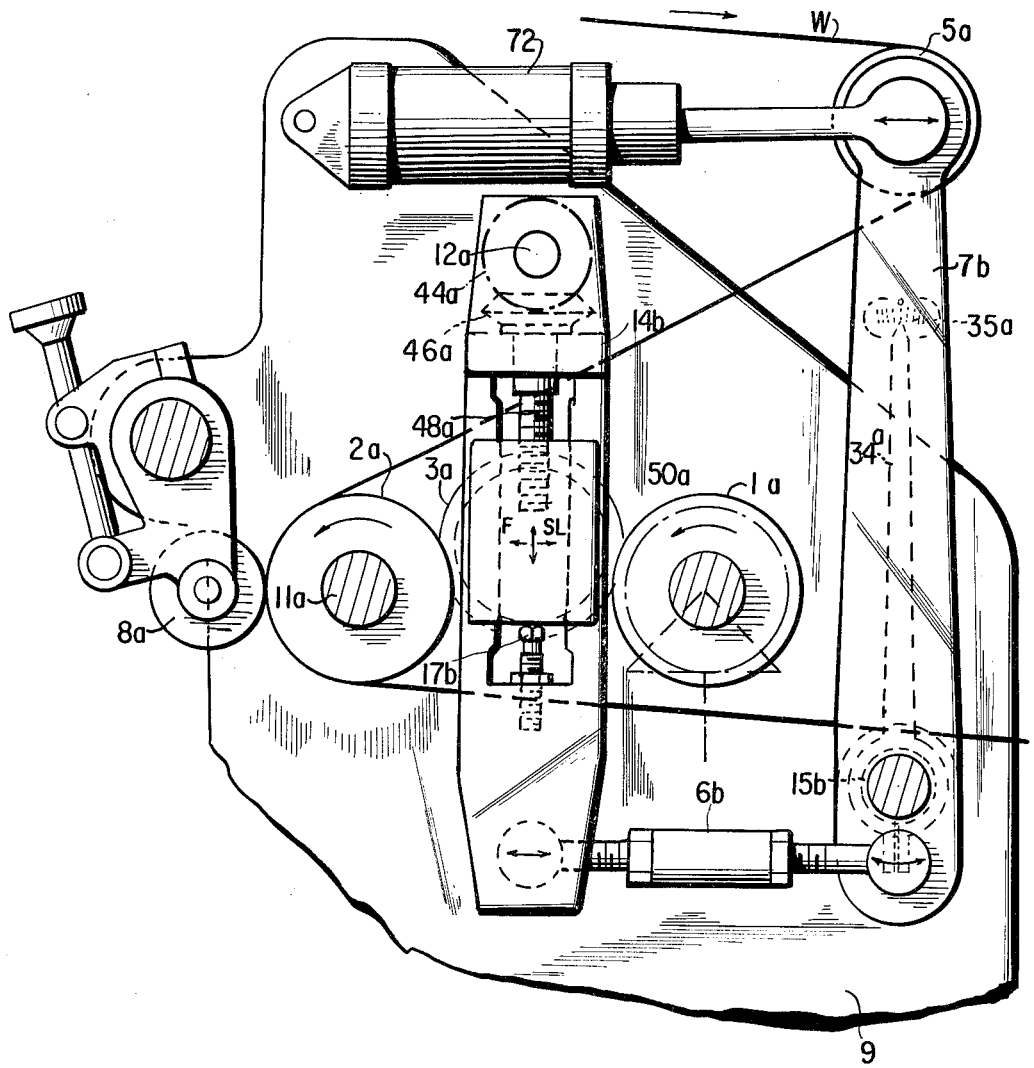
FIG. 9 represents an end view on an enlarged scale of the second tension unit shown in FIG. 1 as interposed between the second self-adjusting water roll drive unit and the folder.

The web tension between the first tension unit and the first printing unit is initially adjusted by means of springs 4, 4a illustrated in FIG. 4 causing the float roll 5 mounted in arms 7, 7a to be moved to the left as viewed in FIG. 2 to increase tension or to the right to decrease web tension. It will be understood that the adjustment may be accomplished in the second tension unit also by adjusting the pneumatic cylinders, one being shown at the top of FIG. 9, and designated by 72. The initial adjustment of the web is set to a value equal to the web tension between the first and second printing units and this value is basically determined by the difference between the printing diameters of the first and second printing units and/or the shrinkage of the web as it is passed through the dryer for first-side drying.

It will thus be seen that any change in web tension of the web unwinding from the roll which may be due to web splicing fluctuation, lopsided rolls, baggy webs, or roll brake variations will not be transmitted into the first printing unit since the displacement of the float roll 5 of this first tension unit will immediately compensate and maintain the initial web tension of the web as it travels toward the first printing unit as set forth below.

The displacement of roll 5 will be transmitted through the arms 7, 7a carrying same, linkages 6, 6a attached to 7, 7a, and levers 14, 14a and will cause the rubber roll 3 to be moved toward or away from rolls 1 and 2 according to the directions of movement of levers 14, 14a, which will cause a difference in deflection and flow of the rubber of roll 3 with a corresponding change in surface speed of roll 2 to reestablish the tension equilibrium of the system.

In operation with normal web tension, this tension balances the force of springs 4 (or pneumatic cylinders) and the rubber roll 3 is centrally disposed between roll 1 and 2. Under these conditions the increased surface flow of the rubber on roll 3 at contact points between 1 and 3 and between 3 and 2 is equal.

Due to the differences in surface of rolls 1 and 3, the latter being resilient, such as rubber, it is a known fact that the rubber covered cylinder 3 of the same outside diameter as cylinder 1 will have a lower surface speed than 1 when driven thereby. Also when the rubber covered cylinder 3 drives the cylinder 2, the latter will rotate faster than cylinder 3 after deformation of the latter is sufficient to overcome slippage. The cylinders 1, 3 and 2 are normally so related for coaction.

It follows that steel roll 1 imparts a slower surface speed to roll 3 due to the increased flow of the rubber through the restricted contact between these rolls, while roll 3 imparts a higher surface speed to roll 2 due to the increased flow of the rubber through the restricted contact between these rolls.

Thus, while both restrictions are equal, the speed decrease of the first contact (1 and 3) and the speed increase of the second contact (3 and 2) will be the same magnitude, but in opposite direction, to impart an identical surface speed to roll 2 relative to roll 1. The system is in equilibrium, and the web is forwarded at basic web speed, corresponding to a related web tension as originally set up in the press.

However, if for any of the above-mentioned reasons, the web tension tends to increase and upset the balance of web tension, and spring (or air pressure) forces, the web pressures on float roll 5 move arms 7, 7a immediately in clockwise rotation and, in turn, move roll 3 toward roll 2 thus increasing the surface speed of roll 2 and thereby the speed of the web controlled by roll 2 and propeller roll 8.

Likewise, if a decreasing web tension is upsetting the balance between normal web tension and spring or air pressure loads, float roll 5 and arms 7, 7a will move in anti-clockwise rotation and, in turn, force roll 3 toward roll 1 to proportionally decrease the surface speed of roll 2, propeller roll 8 and the web speed to maintain normal web tension.

Figure 3:
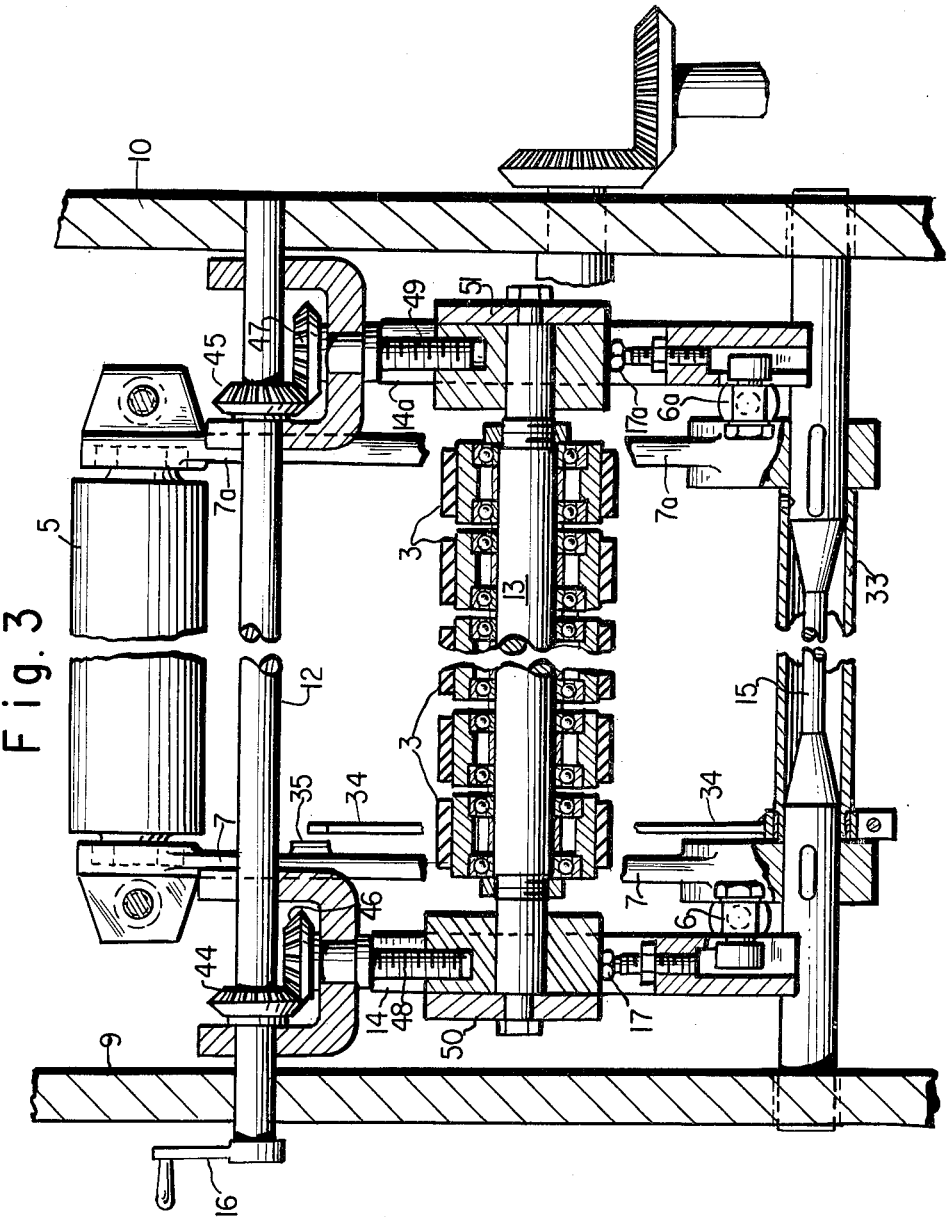
FIG. 3 represents a section taken on the line Z—Z of FIG. 2 looking in the direction of the arrows.

With reference to FIGS. 2, 3 and 4, it will be noted that driving roll 1 is rotatably mounted in side frames 9 and 10, while the roll 2 is rotatably mounted on a stationary shaft 11, also mounted in frames 9 and 10 in parallel relation to roll 1. Roll 3 and shaft 13, interposed between roll 1 and roll 2, are suspended from shaft 12 by means of levers 14, 14a.

Float roll arms 7, 7a are keyed to a torque shaft 15 to allow for a limited angular displacement of float roll 5 and roll 3 in relation to the roll 1 and roll 2 by means of linkages 6, 6a. This bias, therefore, provides the means to properly control the loose and the tight sides of a cambering web, or a baggy web, across its entire width by the compensating angular displacement of the float roll 5 and the roll 3 to impart the independently required surface speed to the sectional roll 2, to maintain a uniform tension across the entire web and to minimize web breaks of such webs.

With further reference to FIGS. 2 and 3, the torque shaft 15 is provided with a tube 33 disposed between float roll arms 7, 7a. Tube 33 is fastened on shaft 15 adjacent to one arm 7a, and free to turn adjacent to the other arm 7. The pointer 34, fastened to tube 33, will, therefore, index any torsional deflection of shaft 15 and a corresponding angular displacement of rolls on scale 35. Under normal operation with a perfect web, no deflections are indicated. However, if a camber in the web is encountered, the system will respond accordingly, and the correspondingly resulting torsional deflection of shaft 15 is indicated on scale 35.

In cases of narrow webs, which may be disposed off the center of the press, the float roll 5 will be subjected to an off-center force and a corresponding angular displacement. Such detrimental displacement is indicated on scale 35. For such narrow webs, therefore, a pre-adjustment is necessary to correct this condition. For the purpose, springs 4 (or the air pressure of air cylinders 72) are adjusted differentially to establish the required web tension with pointer 34 on the zero mark on scale 35, thus indicating the required initial or normal alignment of float roll 5.

To prevent permanent deformation of the rubber covering of the roll 3 during down time of the press, I provide a crank 16 which is manually operable to turn shaft 12 which, as indicated above, carries levers 14 and 14a, which suspend shaft 13, which carries roll 3. It will be noted that shaft 12 is mounted in side frames 9 and 10 and turns gears 44 and 45 which are mounted on shaft 12. Said gears engage a second set of gears 46 and 47. The cooperation of these gears causes the threaded members 48 and 49 to raise and lower the hangers 50 and 51 which raise the roller 3 by elevating its shaft 13. (See FIG. 3.)

It will be noted that stops or nuts 17 and 17a are not moved by the elevation of roll 3 and same, therefore, re-establish the correct or desired initial operating position of roll 3 with respect to rolls 1 and 2. The web travels from the first tension unit to and through the first printing unit designated generally by P1. Said first unit comprises the usual impression cylinder and its printing cylinders, and when the web has been printed on one side, it is passed from said first printing unit to and through the dryer D, where it is heated, and then into the cooling rolls 20, 21 which are driven by a self-adjusting drive unit now to be described.

The web is passed around a compensating roll 26 mounted in arms 28 of duplicate Y-shaped members fulcrumed on a shaft 27, the other arms of said Y-shaped members being designated by 28a, said latter arms carrying a web-compensating roll 26a. A hard surfaced roll 19 is driven from the press at a uniform, basic, surface speed by the usual arrangement of a vertical shaft 59 carrying gears 55 and 56 at its opposite ends for engagement with a gear 57 on the main press drive shaft and a gear 58 on the shaft of roll 19. The web passes from the web-compensating roll 26 around cooling roll 20 over an intermediate roller 23a and around cooling roll 21 and web-compensating roll 26a. Cooling rolls 20 and 21 are connected by suitable gearing 22, 23 and 24 and are driven by the rubber-covered roll 25 which is adjustably interposed between and in contact with the roll 19 and water roll 20.

In operation, the compensating rolls 26 and 26a, mounted in the arms 28 and 28a in said Y-shaped members fulcrumed on shaft 27, are normally held in balance by the equal forces of the web entering on roll 26 and leaving the unit on roll 26a, thus indicating that the surface speed of the water rolls 20 and 21 conforms to the prevailing web speed.

However, subjected to thermal contraction, the water rolls 20 and 21 will not always conform to the prevailing web speed. Shrinking diameters, corresponding to lower temperatures, tend to reduce surface speed, with correspondingly increasing tension on the outgoing and decreasing tension on the ingoing web.

This condition will move the float rolls 26 and 26a, suspended on arms 28 and 28a, on shaft 27, in anti-clockwise direction. Connected by means of suitable adjustable linkage, 29, 29a and 30, 30a (connected by bell cranks 61, 61a pivoted at 62) and levers 31, 31a, pivoted on shaft 32, rubber roll 25 will also deviate from its normally central disposition between roll 19 and water roll 20, increasing its force against the water roll 20 and decreasing its force against driving roll 19.

The resulting change of deflection of the rubber covering will cause the surface rubber to flow slower through the restriction between roll 19 and rubber roll 25 and faster between rubber roll 25 and the water roll 20. The resulting increase in surface speed of the water rolls 20 and 21 will establish an equalized web tension. When, as often happens, the surface of the water rolls becomes tacky and tends to alter the tension of the web by changing its speed, the unit will operate in the same manner, to lower the water roll speed and thereby maintain the predetermined tension.

Thus, the function of this water roll drive is to provide an automatically maintained surface speed of the water rolls to conform to the prevailing web speed, independent of any basic predetermined web tension between the first and the second printing unit and in spite of any change of the water roll diameters due to thermal contraction of the latter, while retaining a given length of web lead or path between printing units.

Figure 6:
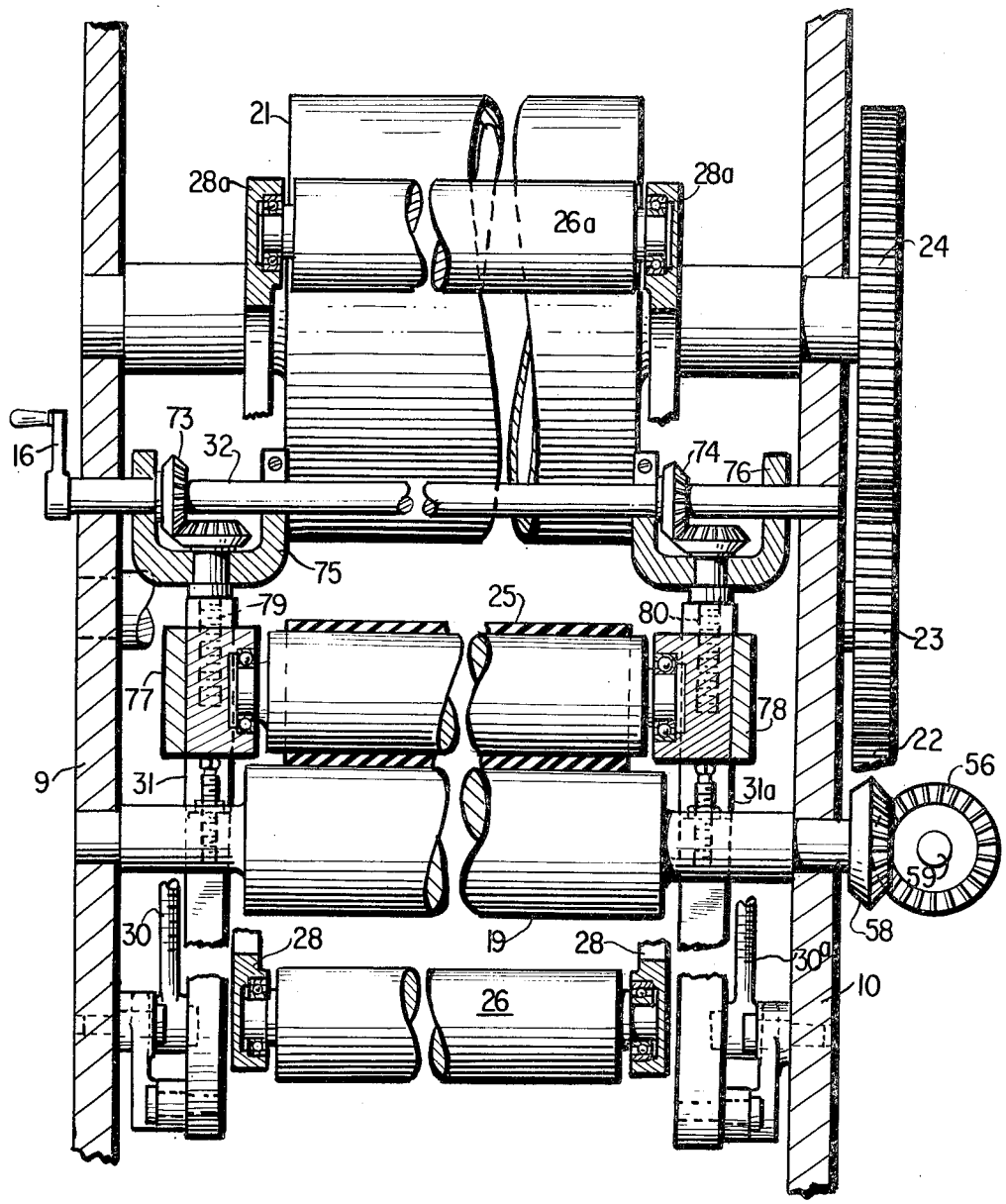
FIG. 6 represents a section on the line W—W of FIG. 5 showing the self-adjusting water roll drive in plan view partly in section and partly broken away looking in the direction of the arrows.
Figure 7:
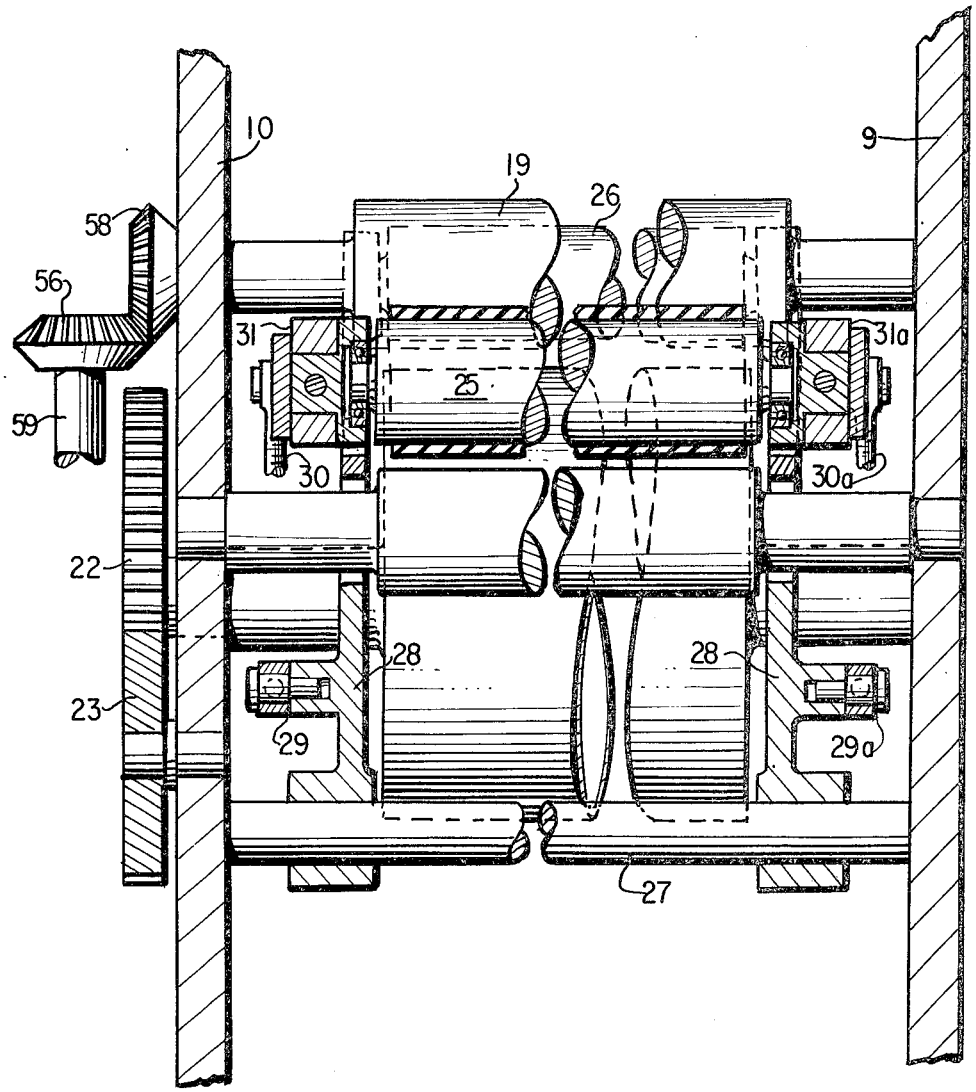
FIG. 7 represents a section taken on the line X—X of FIG. 5 looking in the direction of the arrows.

It will be noted from an inspection of FIG. 6 that means is provided for moving the rubber roll out of contact with cooling roll 20 and the roll 19. The means is similar to that described with respect to the first tension unit and comprises gears 73 and 74 on shaft 32 meshed with gears 75 and 76 adapted to raise the hangers 77 and 78 by the actuation of the threaded members 79 and 80.

Between the first self-adjusting water roll drive unit and the second printing unit, the latter being designated by P2, I have provided manually adjustable web compensators 60 and pre-adjusted, air-pressurized compensator 18, as illustrated in FIG. 1.

When the web has left the compensator 18, it enters the second printing unit P2 where it is perfected in multi-color in the usual manner and then is passed back through the dryer D.

Referring to FIG. 1, the web between the first and second printing unit is subjected to a basic predetermined tension and stretch, dependent on the customary difference of the printing diameters of the first and second printing units, the web speed, the lay of ink and the rate of shrinkage in the dryer.

This web tension and its related stretch will not change as long as speed and drying rate are constant. Any change in web speed requires a relative change in drying or shrinkage rate to maintain uniform web tension.

An increased web speed, without a proportionately increased drying or shrink rate, produces a long web with decreased tension between printing units. A decreasing web speed without a proportionately decreased drying or shrink rate produces a short web and an increased tension between printing units. Pre-adjusted, air-pressurized compensator 18 automatically prevents such tension changes as noted above and also compensates for long and short webs to maintain back-to-back registration.

Figure 8:
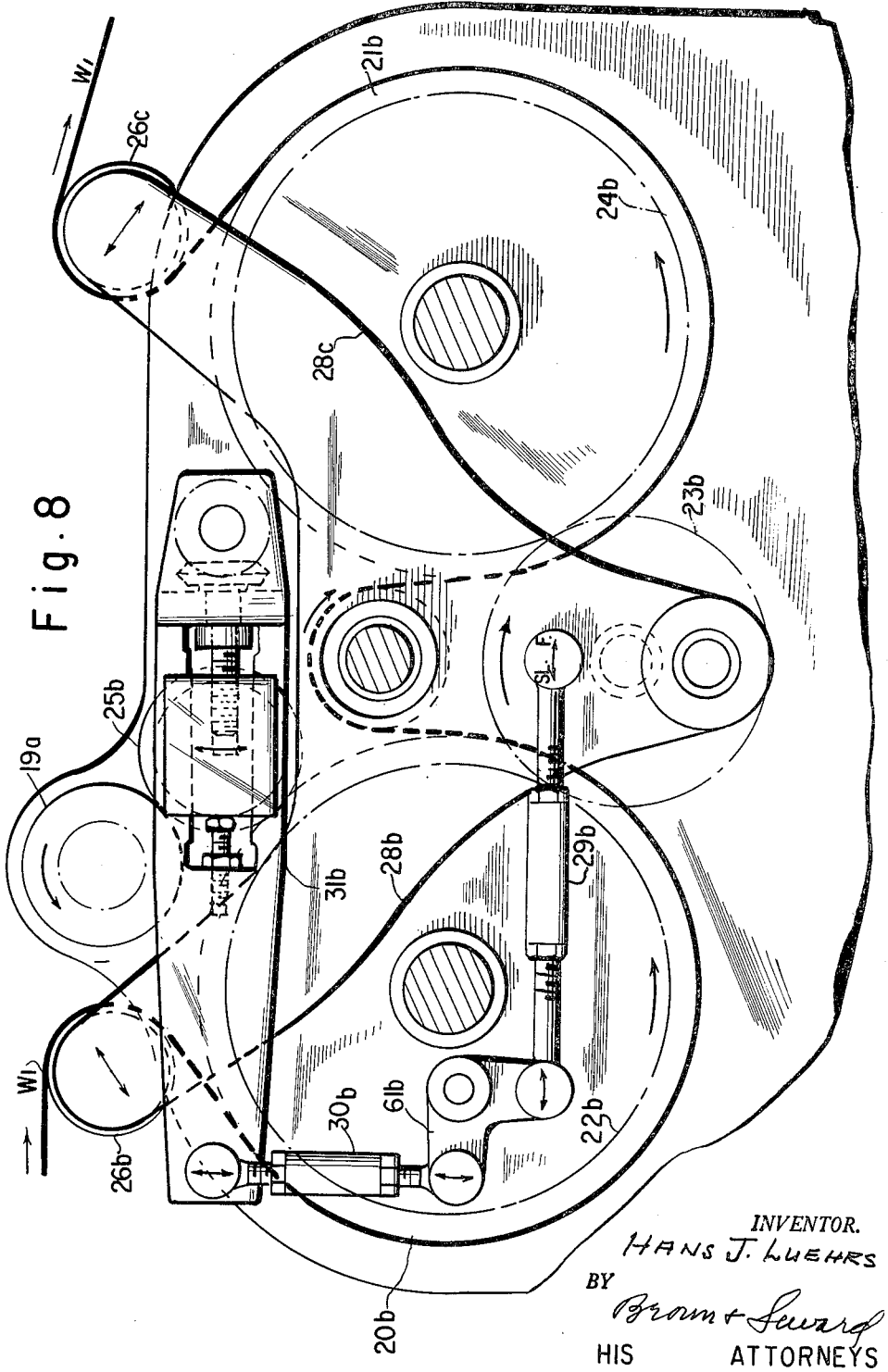
FIG. 8 represents an end view of the second self-adjusting water roll drive unit shown in FIG. 1 as located between the dryer and the second tension unit.

Upon emerging from the dryer D, the web enters a second self-adjusting water roll drive unit. (See FIG. 8.) This second unit pre-adjusts, behaves and is driven in a manner identical with that of the first self-adjusting water roll drive unit, being composed of identical parts which include those mentioned with respect to the first unit as mounted, web-compensating rolls 26b, 26c, cooling rolls 20b, 21b driven from a press-driven roll 19a by the intermediate rubber-covered roll 25b through the roll 20b and gears 22b, 23b, 24b. (See FIG. 8.)

The means for setting up the initial tension in this unit include adjustable linkages 29b, 30b and 31b (and 29c, 30c and 31c, not shown) interconnected with bell cranks 61b (and 61c, not shown), respectively.

Following the second self-adjusting water roll drive unit, I provide a manually adjustable web cutoff compensator 89 (FIG. 1) through which the web is forwarded to a second tension unit which is located ahead of the folder.

The second tension unit (FIG. 9) is identical with the first tension unit with the exception of pneumatic cylinders 72 (72a, not shown) which are comparable to the springs 4, 4a in effect, as same may be initially adjusted to a predetermined pressure. The other elements of the second tension unit include a float roll 5a, adjustable linkages as 6b, interconnecting float roll levers 7b, and suspension levers 14b. Rubber-covered roll 3a is suspended in levers such as 14b for displacement with respect to rolls 1a and 2a. As is evident from an inspection of FIG. 8, the operation of the above, and the remaining components of the unit, conform to that of the first tension unit and further detailed description is not deemed necessary, except to emphasize that this second unit is also adapted for preadjustment to correct for any off-center forces and angular displacement caused by webs disposed off the center of the press.

It should be noted that linkages 6b, levers 7b and 14b are duplicated on the opposite side of the press.

It will be noted that rolls 3 and 3a in the first and second tension units, respectively, are formed of a plurality of similar sections located on the same horizontal shaft. Each roll section is independently mounted for rotation on its shaft, as is illustrated in FIGS. 3 and 4, so that each section of the resilient surfaced rolls 3 and 3a is arranged to contact an opposite independent section on roll 2 or 2a. The latter rolls 2 and 2a are constructed with similar sections longitudinally disposed on a single shaft. All of the above rolls are so constructed in order to react to and accommodate differences in sectional pressure which may be set up by torsional deflections of shafts 15, 15a due to web irregularities which may occur for reasons outlined above. When changes in web tension across the web cause such deflection, one end of the driven hard-surfaced roll 2 or 2a may be caused to rotate at a different speed than the other end, and the difference will correspond to the effect transmitted by the float roll reaction to changes in tension at any part of the web.

It will be noted that the directions of web travel, rotation of rolls and cylinders and possible movements of levers and pivots are indicated on the respective drawings by appropriate arrows.

In summary of the above description, the inherent web tension between the first and second printing units is established in the design of the press and is of a nearly permanent magnitude. Shrinkage or elongation of the web therebetween is compensated by means of the automatic compensator 18. The first cooling rolls, conforming to the web speed, do not disturb this web tension.

The first tension unit forwards the web into the first printing unit in conformity with the web speed and web tension prevailing between printing units, irrespective of fluctuation in the web supply roll reel. An equal and uniform web tension before and after the first printing is thus provided.

The second tension unit provides the required web tension between the second printing unit and the folder. It is pre-adjusted to equalize the web tension between printing units and compensates for web length variations to maintain cutoff register. It also prevents cutoff fluctuations in the second printing unit. An equal and uniform web tension, before and after the second printing, is thus provided.

The second water rolls conform to automatically prevailing web tension and web speed between the second printing unit and the second tension unit without disturbance of the web length between these units.

Although a double five-color typographical printing press is shown in this description, it is understood that other arrangements of the components will provide equally effective applications for web offset presses, web gravure presses and other web processing operations.

The present invention represents an improvement over that of U.S. Patent No. 3,093,069, dated June 11, 1963.

Since it is evident that changes may be made in the form, construction and arrangement of the several components and elements without departing from the spirit and scope of my invention, I do not intend to be limited to the specific embodiments herein shown and described except as set forth in the appended claims or to their reasonable equivalents.

What I claim is:

1. A variable speed drive comprising a hard surfaced driving roll, means for driving same, a hard surfaced driven roll, a resilient deformable surfaced roll interposed between and in deformable contact with said hard surfaced rolls, means in equilibrium and subjected to opposing forces and other means interconnected therewith and actuated thereby at any change in said forces on said first means for changing the contact of the resilient deformable surfaced roll with both hard surfaced rolls and deflecting the deformable surface whereby the deflection of the resilient deformable surface at the contacts with the hard surfaced rolls determines the speed of the second hard surfaced roll.

2. The combination according to claim 1 in which the hard surfaced rolls are steel rolls, and the resilient deformable surfaced roll is a rubber roll.

3. The combination according to claim 1 in which the hard surfaced driven roll and the resilient deformable surfaced roll each comprise opposed independently rotatable sections whereby the deflection of the resilient deformable surface sections at the contacts with the hard surface roll sections determines the speed of the sections of the hard surface driven roll.

4. The combination according to claim 1 including means for laterally deflecting the means subjected to opposing forces.

5. The combination according to claim 1 including means for automatically actuating the means subjected to opposing forces and the means interconnected therewith and actuated thereby at any changes in said forces on the means subjected to said forces whereby the speed of the driven hard-surfaced roll is correlated with the value of the stronger of the opposing forces to restore the said forces to equilibrium and maintain a desired speed of the second hard-surfaced roll.

6. The combination according to claim 1 wherein the deflection of the resilient deformable surfaces at the contacts with the hard surfaced rolls determines the speed of the second driven hard surfaced roll independently of the normal speed of the first driven hard surfaced roll.

7. A variable speed drive according to claim 1 in which the hard driving roll is solid, one hard-surfaced roll is sectional, the intermediate roll is sectional and in operative engagement with said first-named rolls and including means for automatically controlling the speed of the intermediate roll sections and thereby the speed of the sections of said sectional hard-surfaced roll whereby the section speed may differ among sections of the same roll.

8. In a rotary printing press or other web processing machinery, the combination which includes a web supply, means for taking a web therefrom under tension, web processing means and web tension control mechanism comprising at least one web tension control unit and variable speed means for driving same, said last named means comprising a hard surfaced driving roll, means for driving same, a hard surfaced driven roll, a resilient deformable surfaced roll interposed between and in deformable contact with said hard surfaced rolls, means, including a floating web roll, subjected to opposing forces, and means interconnected therewith and actuated thereby at any change in said forces on said means subjected to said forces for changing the contact of the resilient deformable surfaced roll with both hard surfaced rolls and deflecting the deformable surface whereby the deflection of the resilient deformable surface at the contacts with the hard surfaced rolls determines the speed of the driven hard surfaced roll.

9. A structure according to claim 8 comprising a plurality of web tension control units and variable speed means for driving same, one of said tension control units being located between the web supply and the first processing unit.

10. The combination according to claim 8 in which the means subjected to opposing forces include means for resiliently opposing the forces against said roll and other means interconnected therewith and actuated thereby for changing the contact of the resilient deformable surfaced roll with both hard surfaced rolls and deflecting the deformable surface whereby the deflection of the resilient deformable surface at the contacts with the hard surfaced rolls determines the speed of the driven hard surfaced rolls.

11. The combination according to claim 5 in which in the first-named variable speed means for driving the web tension control unit the hard-surfaced driven roll is sectional, the resilient deformable-surfaced roll is sectional and the means for automatically controlling the speed of the intermediate roll sections and thereby the speed of the sections of said sectional hard-surfaced roll whereby the speed of individual roll sections maintains the web at predetermined tension by overcoming localized dimensional variations of said web include means contacted by and directly responsive to any variation in the web.

12. A variable speed drive comprising a hard surfaced driving roll, means for driving same, a hard surfaced driven roll, a resilient deformable surfaced roll interposed between said hard surfaced rolls, means subjected to opposing forces and other means interconnected therewith and actuated thereby for changing the contact of the resilient deformable surfaced roll with both hard surfaced rolls, means for lateral deflection of the means subjected to opposing forces and means for indicating the amount of lateral deflection to be overcome for restoration of the equilibrium of the system.

13. A structure according to claim 12 including a web in which the means subjected to opposing forces include a floating web roll engaged by the web and means for passing the web over said web roll under tension, the operating surface of said floating web roll consisting of a multiple of fractions throughout the web width.

14. A structure according to claim 12 in which the means subjected to opposing forces include a web and a floating web roll engaged thereby and means for passing a web thereover under tension including means for laterally deflecting the means subjected to opposing forces including the web roll for maintaining different tensions across the web.

15. A structure according to claim 12 in combination with a printing press including a web supply, means for taking a web therefrom under tension and in which the means subjected to opposing forces include a floating web roll engaged by the tensioned web and a plurality of tension units and web processing units interconnected with said means subjected to opposing forces for maintaining web tension at the web supply and the said processing unit.

16. The combination according to claim 12 including a tensioned web engaging the means subjected to opposing forces in which the means for lateral deflection of the means subjected to opposing forces and for compensating therefor include a shaft, a tube fastened on said shaft and connected to one end of the means subjected to opposing forces, said tube being free to turn adjacent the other end of said means subjected to opposing forces whereby the desired tension is maintained across the web.

17. In a rotary printing press or other web processing machinery, the combination which includes a web supply, means for taking a web therefrom under tension, a plurality of web processing units, web advancing means for maintaining web tension located between web processing units, other means for driving some of said processing units and means contacted by and actuated by the web for determining the speed of the web advancing means and the means for driving some of said processing units, all of said means being responsive to changes in web tension transmitted to any part of the means contacted by and actuated by the web whereby predetermined web tension is maintained at each web processing unit.

References Cited by the Examiner

UNITED STATES PATENTS

| | | | |
|---|---|---|---|
| 2,248,384 | 7/1941 | Redin | 74—193 |
| 2,439,026 | 4/1948 | Schneider | 74—193 |
| 3,093,069 | 6/1963 | Luehrs | 101—179 |

ROBERT E. PULFREY, *Primary Examiner.*

UNITED STATES PATENT OFFICE
CERTIFICATE OF CORRECTION

Patent No. 3,220,347                      November 30, 1965

Hans J. Luehrs

It is hereby certified that error appears in the above numbered patent requiring correction and that the said Letters Patent should read as corrected below.

Column 9, line 14, for the claim reference numeral "5" read -- 8 --.

Signed and sealed this 31st day of May 1966.

(SEAL)
Attest:

ERNEST W. SWIDER                      EDWARD J. BRENNER
Attesting Officer                         Commissioner of Patents